United States Patent [19]

Kornylak

[11] 4,421,227

[45] Dec. 20, 1983

[54] TILTING SHELF, VERTICAL CONVEYOR

[75] Inventor: Andrew T. Kornylak, Hamilton, Ohio

[73] Assignee: Kornylak Corporation, Hamilton, Ohio

[21] Appl. No.: 274,471

[22] Filed: Jun. 16, 1981

[51] Int. Cl.³ ............................................. B65G 17/18
[52] U.S. Cl. .................................... 198/800; 198/802
[58] Field of Search ...................... 198/706, 800, 802

[56] References Cited

U.S. PATENT DOCUMENTS

| | | | |
|---|---|---|---|
| 2,747,724 | 5/1956 | Kornylak | 198/802 |
| 2,869,708 | 1/1959 | Nesseth | 198/802 |
| 3,044,602 | 7/1962 | Amato | 198/706 |
| 3,365,052 | 1/1968 | Kornylak | 198/802 |
| 3,575,281 | 4/1971 | Sutton | 198/800 |
| 3,664,482 | 5/1972 | Kornylak | 198/800 |
| 3,854,570 | 12/1974 | Kornylak | 198/800 |

Primary Examiner—Joseph E. Valenza
Attorney, Agent, or Firm—Thomas E. Beall, Jr.

[57] ABSTRACT

A tilting shelf type vertical conveyor wherein a plurality of shelves are pivotally mounted between two endless chains that are driven by pairs of upper and lower sprockets, is provided with a shelf control system having effectively a single track formed by a first track half adjacent one chain and a second track half adjacent the other chain. One side of the shelf is provided with two rollers for engaging in one of the tracks, whereas the other side of the shelf is provided with two rollers, generally at right angles to the first two rollers, for engagement with the other track. The shelf position is controlled during the conveying run by one set of rollers and track, and during the return run with the other set of rollers and track. During the transition between runs at the top and bottom, the shelves are controlled by the pivot axis having its position fixed by the sprocket path and only one roller of each pair of rollers engaging its associated track, for which purpose the tracks are of reduced depth adjacent the sprockets and the rollers of each pair are axially offset.

5 Claims, 5 Drawing Figures

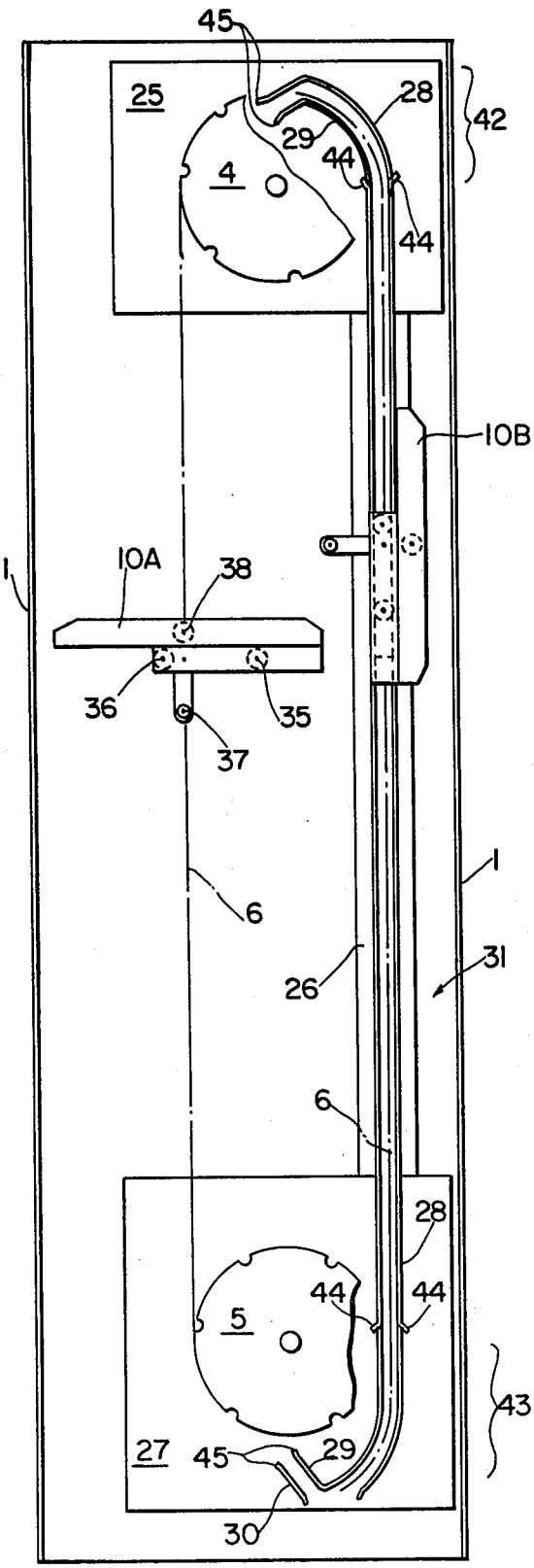
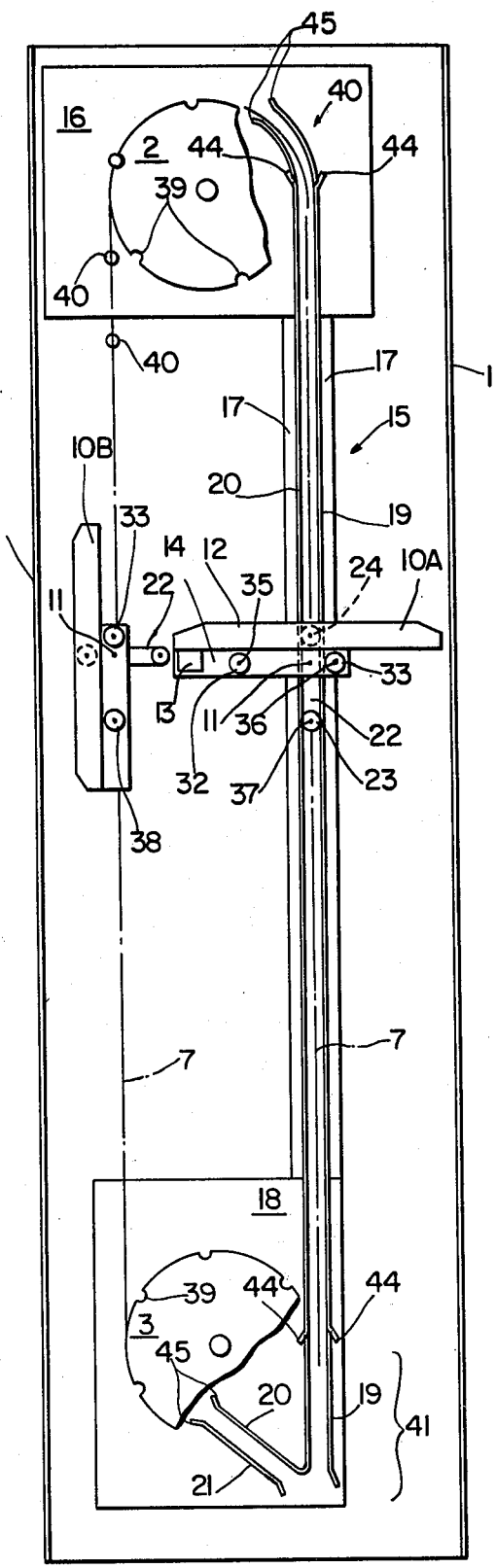
FIG. 2
FIG. 3

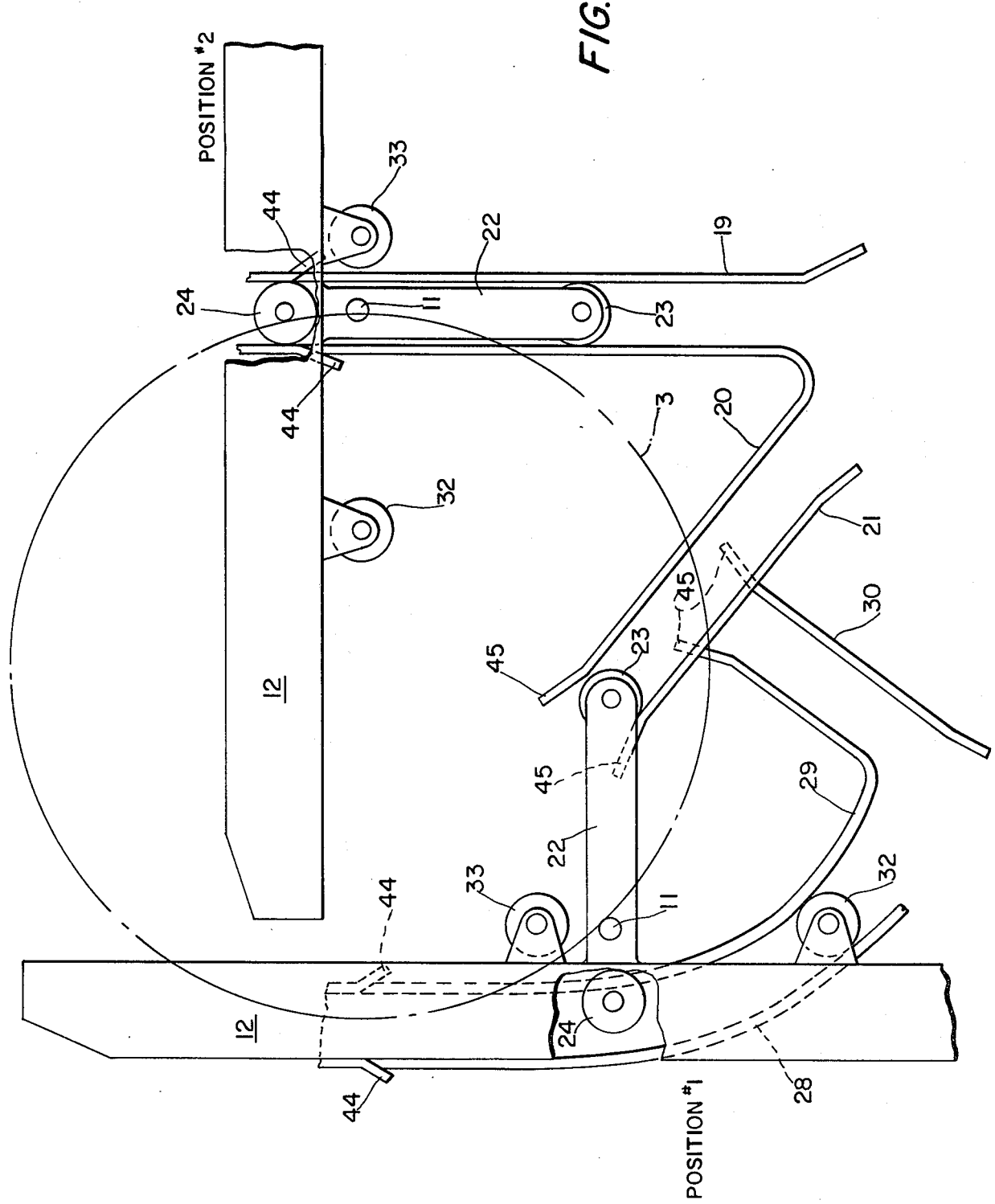

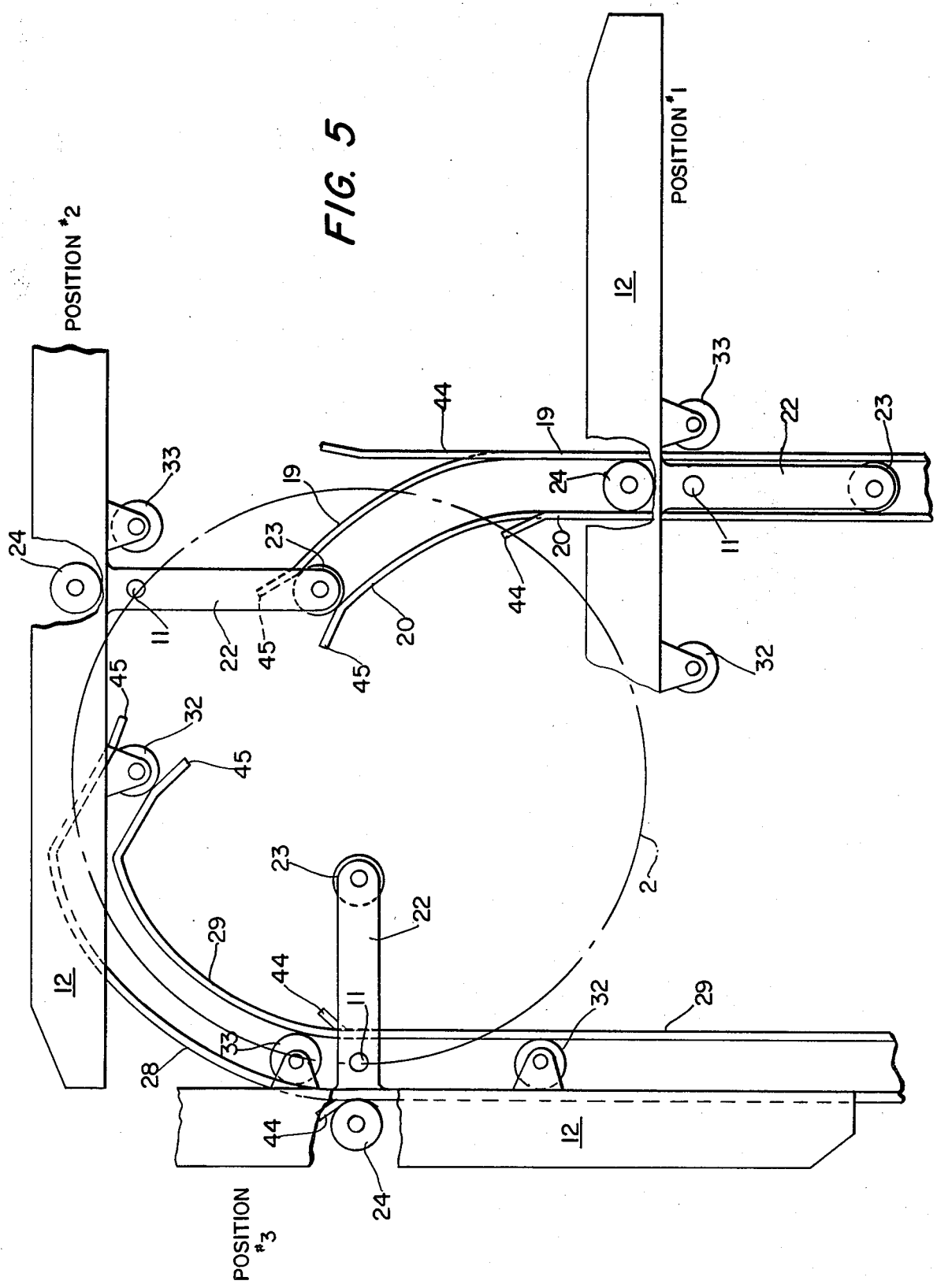

TILTING SHELF, VERTICAL CONVEYOR

BACKGROUND OF THE INVENTION

When moving articles vertically between stations, including loading and unloading, it is desirable to provide a vertical shelf conveyor, wherein the articles are held on shelves that are moved vertically by means of one or more endless chains that are driven by engaging sprockets. To reduce space requirements, it is desirable to pivot the shelves from a horizontal load carrying position to a vertical return position used while the shelves travel along the return path of the endless chains. Stability of the shelves is highly desirable for conveying purposes.

A vertical conveyor such as that shown in the U.S. Pat. to Nesseth No. 2,869,708 issued Jan. 20, 1959, does not positively control the shelf position during the return run.

In tilting shelf conveyors such as shown in U.S. Pat. Nos. 2,747,724 issued May 29, 1956 and 3,365,052 issued Jan. 23, 1968, the shelves are under the control of two spaced apart tracks for each run, which requires considerable accuracy in the location and construction of the tracks, as well as expense in their manufacture and assembly. Further examples of such conveyors are U.S. Pat. Nos. 3,664,482 issued May 23, 1972; and 3,854,570 issued Dec. 17, 1974.

SUMMARY OF THE INVENTION

The present invention simplifies the construction of tilting shelf or tray type vertical conveyors while providing for control of the shelf positioning throughout the entire run of the conveyor. This results in considerably reduced construction costs, as well as costs of assembly and maintenance.

Effectively, a single track is provided, half of which is provided on one side of the shelf and the other half of which is provided on the other side of the shelf, so that a first set of rollers can travel in one track and at the transition between the tracks, control is taken over by a second set of rollers in the second track, with the second set of rollers angularly related, preferably perpendicular, to the first set of rollers. For each set, both rollers travel in the same track during both the return run and the conveying run. One roller of each set is released during the transition between tracks, because the shelf is stably oriented by only one roller and the rigidity of the adjacent drive sprocket that positively determines the path of the shelf pivot axis.

BRIEF DESCRIPTION OF THE DRAWING

Further objects, features and advantages of the present invention will become more clear from the following detailed description of a preferred embodiment, shown in the accompanying drawing, wherein:

FIG. 2 is a view taken along from line II—II of FIG. 1, with some portions removed;

FIG. 3 is a view taken from line III—III of FIG. 1, with some portions removed;

FIG. 4 is an enlarged view of the top portion of FIG. 3 with the shelf shown schematically, the chain removed, and the track superimposed; and FIG. 5 is an enlarged view of the top portion of FIG. 3, corresponding to FIG. 4 with respect to elements shown.

DETAILED DESCRIPTION OF A PREFERRED EMBODIMENT

Figure 1:
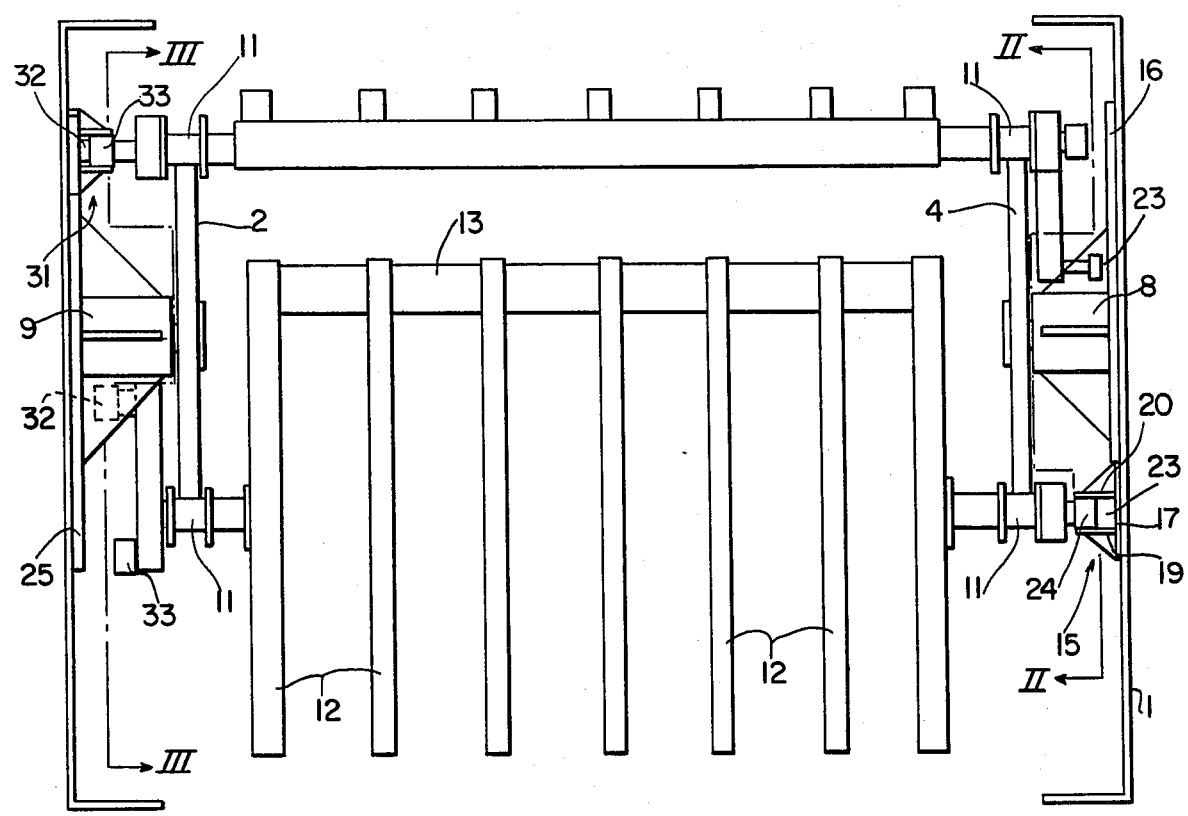
FIG. 1 is a plan view of a single track, tilting shelf, vertical conveyor constructed according to the present invention.

The present invention may take on many different forms according to its broader aspects. One preferred embodiment will be set forth with respect to illustrating these broader aspects, while at the same time setting forth specific details that are important in their own right.

Generally, this type of conveyor is employed in corrosive environments, such as onboard Naval vessels. As a result, it is the requirement many times that the tracks be constructed of a material such as stainless steel, which is extremely expensive in view of the thickness of the tracks required and their length that may be a hundred or more feet. Therefore, material cost and the cost of fabricating this material is a considerable expense. Further, when side-by-side tracks are employed for simultaneously controlling separate rollers, it is critical that these tracks be accurately located with resepect to each other to prevent binding, while at the same time having a secure fit of the roller within the track to prevent vibration. This presents a considerable problem in installation that requires considerable skill and expense. Further, maintenance can be a problem later due to wear or misalignments. At the same, however, it is desirable to provide for secure control of the shelf throughout its entire movement so as to provide for secure conveying of the loads and accurate and vibration free movement of the shelves in their return positions. Further requirements of these types of conveyors are clearly set forth in the above-mentioned patents, particularly those patents to Andrew T. Kornylak. The disclosure of the patents to Andrew T. Kornylak is incorporated herein with respect to the discussion of such problems, needs, and further with respect to the motor, gearing, sprocket and chain drives for such shelves, and the pivotal mounting of such shelves on the chains, which are all common with the present invention. That is, in the preferred embodiment, the present invention may employ the features of such Kornylak patents, and differ only in the construction of the tracks, and the location and number of rollers that are guided in the tracks. Therefore, such common elements between the preferred embodiment of the present invention and the above-mentioned Kornylak patents will not be shown in detail herein, to emphasize the novel aspects of the present invention, although these novel aspects are important in combination with the overall conveyor environment.

A rigid frame is employed for mounting the conveyor structure, and preferably is an integral, vertical, rectangular cross sectional, tube constructed of welded plate steel and provided with a plurality of openings, with or without doors, at vertically spaced locations for loading/unloading articles to be carried by the shelves. As shown in the right hand side elevation view of FIG. 3 and the left hand side elevation view of FIG. 2, the frame is provided with an upper end shown in more detail in FIG. 5, a lower end shown in more detail in FIG. 4, a front transfer area that would have the above-mentioned openings shown to the right in FIG. 3 and to the left in FIG. 2, and a rear return area shown to the left in FIG. 3 and to the right in FIG. 2. On the right hand portion of the frame, an upper sprocket 2 is rotatably mounted about a horizontal axis on the frame by means of a journal 9, and a lower sprocket 3 is similarly mounted for rotation in the same plane. One endless chain 7 is drivingly engaged and operatively mounted about the sprockets 2, 3 for rotation therewith in the common vertical plane parallel to that of FIG. 3. In a similar manner, an upper sprocket 4 is rotatably mounted about a horizontal axis on the left hand portion of the frame by means of a journal 8 and a lower sprocket 5 is rotatably mounted on the same left hand portion of the frame by a similar journal for rotation in the same vertical plane that is horizontally spaced from and parallel to the vertical plane of the sprockets 2, 3. An endless single chain 6 drivingly engages and is operatively mounted on the sprockets 4, 5 for rotation therewith in their common plane. The chains are of heavy construction and can be referred to as single or double pivoted link chains. A plurality of shelves 10a, 10b are pivotally mounted between the chains, preferably by means of journals 11 that actually form a pivot for adjacent links of the chain as well as forming the pivot for the shelves and defining the shelf pivot axis. The shelf pivot axis could also be offset from and separate from a chain link pivot axis, but this is not preferred. Suitable controls, motors, and gearing are provided, although not shown in the drawing, in a known manner to drive the sprockets chains and shelves along the endless path of the chains, in either direction. The shelves are preferably provided with a plurality of fingers 12 rigidly interconnected by a back bar member 13 and reinforced at their journal portions by means of a beam 14, in a known manner. For details of the specific structure of the frame, sprockets, chains, and shelves, as well as their mounting and driving, reference is made to the above-mentioned Kornylak patents.

The following novel features of the present invention have specific advantages when employed in the above-mentioned conventional type of pivoting shelf vertical conveyors.

The shelves are positively controlled in an economical and reliable manner by means of effectively a single track, which is split into a first part shown in the right hand side of the frame in FIG. 3 and a second part shown in the left hand side of the frame in FIG. 2.

As shown particularly in FIG. 3, a cam track 15 is formed over approximately one-half of the endless chain path and particularly provides control for the conveying portion of the shelf travel. Preferably, the cam track is of a channel shape, particularly U-shaped opening horizontally toward the chains. Preferably, it is constructed of stainless steel backing plates 16, 17, 18 that are welded to the sheet metal of the frame and form the web portion of the channel shape for the cam tracks, and further formed of sheet stainless steel strips 19, 20, 21 that are welded to the backing plates 16–18 in spaced apart generally parallel relationship. Although shown unconnected for convenience and assembly, the strips 19 and 21 may in fact be connected or integrally in one piece. Each of the shelves has a depending, with respect to its conveying horizontal position, support arm 22 that is rigid with the remaining structure of the shelf and carries at its terminal end portion a roller 23 mounted for rotation about a horizontal axis with respect to the shelf. A second roller 24, forming a pair with the roller 23, is rotatably mounted about a parallel axis on the adjacent shelf portion 12. As seen, the rollers 23, 24 extend within the channel portion of the cam track 15 for substantially the full length of the conveying run that is defined as the vertically extending portion of the chain 7 between the horizontal center lines of the sprocket axes. Since the rollers 23, 24 are of a diameter only slightly smaller than the spacing between the cam track strips 19, 20, 21, it is seen that the shelf is stably controlled during the conveying run of the chain. Preferably, the axes of the rollers 23, 24 define a line that also passes through the axis of the journal 11, and which extends vertically.

In a similar manner, a cam track is formed on the left hand side of the frame, as shown in FIG. 2. Backing plates 25, 26 and 27 are substantially identical to and correspond with backing plates 16, 17, 18, and have welded thereon at right angles strips 28, 29, 30 that correspond to strips 19, 20, 21. The track 31 formed by plates 25, 26, 27 and strips 28, 29, 31 is of a shape similar to, but different from the shape of the cam track 15. Each of the shelves carries an additional pair of rollers 32, 33, which are journaled on the portion 14 of the shelf in spaced apart relationship about axes parallel to each other and parallel to the axes of the rollers 23, 24. FIGS. 4 and 5 depict a schematic mounting of the rollers 32, 33 rather than the preferred specific form shown in FIGS. 1–3, so that details of the track will not be obscured and its relationship to the rollers will be not obscured. These rollers 32, 33 are of slightly smaller diameter than the spacing between the strip 29 and the strips 28, 30. Both of the rollers 32, 33 are received within the cam track 31 throughout its length extending substantially completely along the return run of the conveyor as defined between the horizontal center lines of the sprockets 4, 5 in the rear area of the frame, as opposed to the cam track 15 that extends in the front area of the frame.

Preferably, a line drawn between the axes 35, 36 of the rollers 32, 33 intersects the axis of the journal 11 and intersects the line drawn between the axes 37, 38 of the rollers 23, 24 at right angles, although other angles are possible. In this manner, it is seen that the rollers 23, 24 within the track 15 securely hold the shelf in a horizontal position throughout its conveyor run vertically between the sprockets, and the rollers 32, 33 securely hold the shelf in its vertical space saving position throughout the length of the return run between the upper and lower sprockets. For purposes of driving the conveyor, each of the sprockets is provided with a plurality of widely spaced depressions 39, which receive correspondingly spaced enlarged journal portions of the chains 6, 7 (only a few being shown in FIG. 3). The journal 11 is similar to the portions 40 and replaces one in the chain so as to engage within a depression 39. Thereby, it is preferable to drive both upper sprockets 2, 4 or both lower sprockets 3, 5.

There is an upper transition path of each shelf between the conveying path and the return path, as the shelf moves around the upper portion of the sprockets 2, 4. Similarly, there is a lower transition path between the other end of the conveying path and the return path, as the shelves move around the lower sprockets 3, 5. During travel within these transition paths, it is seen that the journal 11 is securely held within a depression 39, of similar diameter. Therefore, it is only necessary to securely guide one roller spaced from the journal 11 in a cam track while traveling in the transition path to provide for stable control of the shelf. Also in these transition paths, control of the shelf is transferred from cam track 15 to cam track 31, or vice versa, depending upon the direction of conveyor rotation and whether the upper or lower transition path is being viewed.

As seen in FIG. 1, the roller 23 is axially offset outwardly from the roller 24, and therefore extends deeper into its cam track 15 than the roller 24. Similarly, the roller 32 is axially offset outwardly from the roller 33, and therefore the roller 32 extends deeper into its cam track 31 than the roller 33. The depth of the cam tracks 15 and 31, as determined by the height of the strips 19, 20, 21, 25, 26, 27, is uniform throughout substantially the full length of both the conveyor path of the shelves and the return path of the shelves, sufficiently to receive securely their respective roller pairs 23, 24 and 32, 33. However, each end portion of each cam track 15, 31 is defined as that portion extending beyond the portion of the cam track that controls the shelf positioning in the conveyor path and the return path. Each end portion of each cam track is of a reduced depth to thereby receive, respectively, only the roller 23 or the roller 32. The end portions 40, 41, 42, 43 of the cam tracks 15, 31 are of a uniform depth, and the transition between the end portions and the remaining return portion and conveying portion of the tracks is characterized by the inner portions of the strips 19, 20, 21, 28, 29, 30 being flared outwardly from the center line of the tracks as shown at 44 so that respective rollers 24 and 33 may be smoothly received in the conveying portion and return portions of the tracks, respectively. In a similar manner, the terminal end of the end portions are flared outwardly at 45 to receive smoothly the rollers 32, 23, respectively. In this manner, it is seen that the roller 23 is under control of the track 15 for a portion of each transition path and the roller 32 is under the control of its track 31 for at least the remaining portion of both transition paths, while the rollers 33 and 24 are released from control by their respective tracks within the transition paths. The control of the tracks 15 and 31 overlaps sufficiently to transfer control from one track to another within each of the transition paths, regardless of the direction of conveyor movement.

FIGS. 4 and 5 are taken substantially along line III—III of FIG. 1, but differ from FIG. 3 in that for purposes of illustration the shelves and chains have been removed and the shelves schematically shown; the tracks have only been shown with respect to their strips, and both tracks have been shown accurately with respect to their shape in regard to the strips; and the sprocket has only been shown schematically for purposes of orientation. With the two tracks superimposed in the same drawing, and the shelves schematically shown with respect to the orientation and interconnection of the rollers, the control of the shelves is easily seen in the transition paths.

With the present invention, it is seen that when compared with the above-mentioned Kornylak patented devices, there are the following advantages. The present invention employs only approximately one-half of a track on one side and one-half of a track on the other side, whereas the patented devices employ two full tracks on each side, of four times the length of track, which would multiply the material cost by four, the manufacturing cost similarly, and greatly increase the assembly time. The difference in assembly time is more than a function of just the length of track, because when a shelf is controlled simultaneously by two tracks and two pairs of rollers, even though one roller may be common to each pair, the tracks must be extremely accurately related to each other or binding will occur, assuming close tolerances between the roller diameter and the track width. If greater tolerances are provided between the roller diameter and the track width, this will permit considerable vibration of the shelves during their travel and thereby damage or dislodge articles being conveyed, as well as to produce considerable noise. The cost of materials alone to produce only the tracks may be in the tens of thousands of dollars, because they are constructed of thick stainless steel plate. Further, the cost of manufacturing, that is bending and welding such tracks is considerable due to the difficulty of working with stainless steel and the high tolerances involved that may be in the order of a few thousandths of an inch. Further, it is extremely difficult to maintain accurate location between two tracks as above mentioned, due to problems of thermal expansion during use and other high tolerances involved, as well as deformation from external stresses and vibrations. If binding does occur for some reason in the above-mentioned patented devices after usage for a considerable period of time, it is quite difficult to then correct track alignment. Conventionally, the tracks are mounted on the frame within the completely constructed tubular frame, where there are considerable space limitations and access limitations, particularly if performed onboard shop in situ. Due to the tolerances involved and the relationships involved, the tracks cannot be mounted until after construction of the frame. Therefore, it is seen that the present invention has great advantages with respect to assembly, since the length of track is considerably less, the location of the track on the frame is not as critical due to the resiliency of the chain and the fact that the shelves are only under the control of one track at all portions of their travel, except for a very brief period of time when they are under the control of only two tracks during the transition paths. This is in contrast to the prior art Kornylak patents mentioned above wherein the shelves are under the control of four tracks for most of their travel. Further, at the brief intervals when the present invention shelves are under the control of two tracks, it is noted that the two tracks are spaced apart for the full width of the conveyor frame, so that some misalignment is tolerated by the flared track ends.

While a preferred embodiment has been set forth in detail, to illustrate the broader concepts of the present invention and as well as the advantageous details, further embodiments, modifications and variations are contemplated, all according to the spirit and scope of the following claims.

What is claimed is:

1. A tilting shelf, vertical conveyor, comprising:
   a frame having an upper end, a lower end, a front transfer area, and a rear return area opposed to said front area;
   two sprockets mounted for rotation about a horizontal axis on said frame at said upper end;
   two sprockets mounted for rotation about a horizontal axis on said frame at said lower end;
   two endless chains drivingly engaging and operatively mounted about said respective upper and lower pairs of sprockets for rotation therewith in respective generally vertical parallel planes;
   a plurality of shelves pivotally mounted for rotation about respective horizontal axes on said chains to define axially opposed shelf ends and for travel with said chains;
   said chains and shelves together moving in a generally vertical conveying path between said sprockets in said front area, and further moving in a generally vertical return path between said sprockets in said rear area;

a first pair of rollers mounted on one axial end of each shelf respectively for rotation about parallel spaced apart horizontal axes;

a second pair of rollers mounted on the other axial end of each shelf respectively for rotation about parallel spaced apart horizontal axes;

for each shelf, a line connecting the axes of said first pair of rollers being generally perpendicular to the line connecting the axes of said second pair of rollers;

only a single first cam track having opposite terminal ends, being mounted on said frame adjacent said one axial end of said shelves, said first track generally following the path of said chains for only approximately one-half of the chains travel;

only a single second cam track having opposite terminal ends, being mounted on said frame adjacent said other axial end of said shelves, said second track generally following the path of said chains for only approximately one-half of the chains travel;

said first cam track being located within the front area of said frame, and said second cam track being located within the rear area of said frame; and said first pair of rollers for each shelf engaging in said first cam track throughout the entire conveying path, and the second pair of rollers for each shelf engaging in said second cam track throughout the entire return path, so that said shelves are held in a horizontal position throughout said conveying path and in a vertical position throughout said return path.

2. The conveyor of claim 1, wherein said first track has a depth, as measured in a direction parallel to said axes, that is diminished at each of its ends;

said second track has a depth, as measured in a direction parallel to said axes, that is diminished at each of its ends; and the two rollers of each pair of rollers for each shelf are axially offset.

3. The conveyor of claim 2, wherein each of said first and second cam tracks has an end portion extending from tangential to said lower sprocket radially outward and then inward to said sprocket, said end portion having a depth sufficiently less than the remainder of said track so as to engage only one of its respective pair of rollers so that as each shelf travels between said conveying run and said return run around said lower sprocket, the shelf will pivot through a first angle about its own axis while said one roller of said first pair is in said end portion of said one track, and will pivot about its own axis through a second overlapping angle of rotation while said one roller of said second pair of rollers is in said end portion of said other track.

4. The conveyor of claim 3, wherein said pivot axis of said shelf to said chains mounting follows the path of said chain.

5. The conveyor of any one of claims 1-4, wherein the roller axes of each shelf are spaced from and parallel to each other, and spaced from and parallel to the axis of rotation of the associated shelf on said chain;

the axis of rotation of each shelf with respect to said chain being at the intersection of the lines joining respective pairs of rollers for each shelf.

* * * * *